Feb. 18, 1958 D. L. SNOW ET AL 2,824,258

HIGH FREQUENCY CAVITY RESONATOR TUNER STRUCTURE

Filed July 14, 1955 2 Sheets-Sheet 1

DONALD L. SNOW &
PETER H. KAFITZ
INVENTORS
BY Paul B. Hunter
ATTORNEY

Feb. 18, 1958 D. L. SNOW ET AL 2,824,258

HIGH FREQUENCY CAVITY RESONATOR TUNER STRUCTURE

Filed July 14, 1955 2 Sheets-Sheet 2

DONALD L. SNOW & PETER H. KAFITZ
INVENTORS
BY Paul B. Hunter
ATTORNEY

United States Patent Office
2,824,258
Patented Feb. 18, 1958

2,824,258

HIGH FREQUENCY CAVITY RESONATOR TUNER STRUCTURE

Donald L. Snow, Palo Alto, and Peter H. Kafitz, Mountain View, Calif., assignors to Varian Associates, San Carlos, Calif., a corporation of California Application July 14, 1955, Serial No. 521,947

19 Claims. (Cl. 315—5.21)

Figures 1, 2:
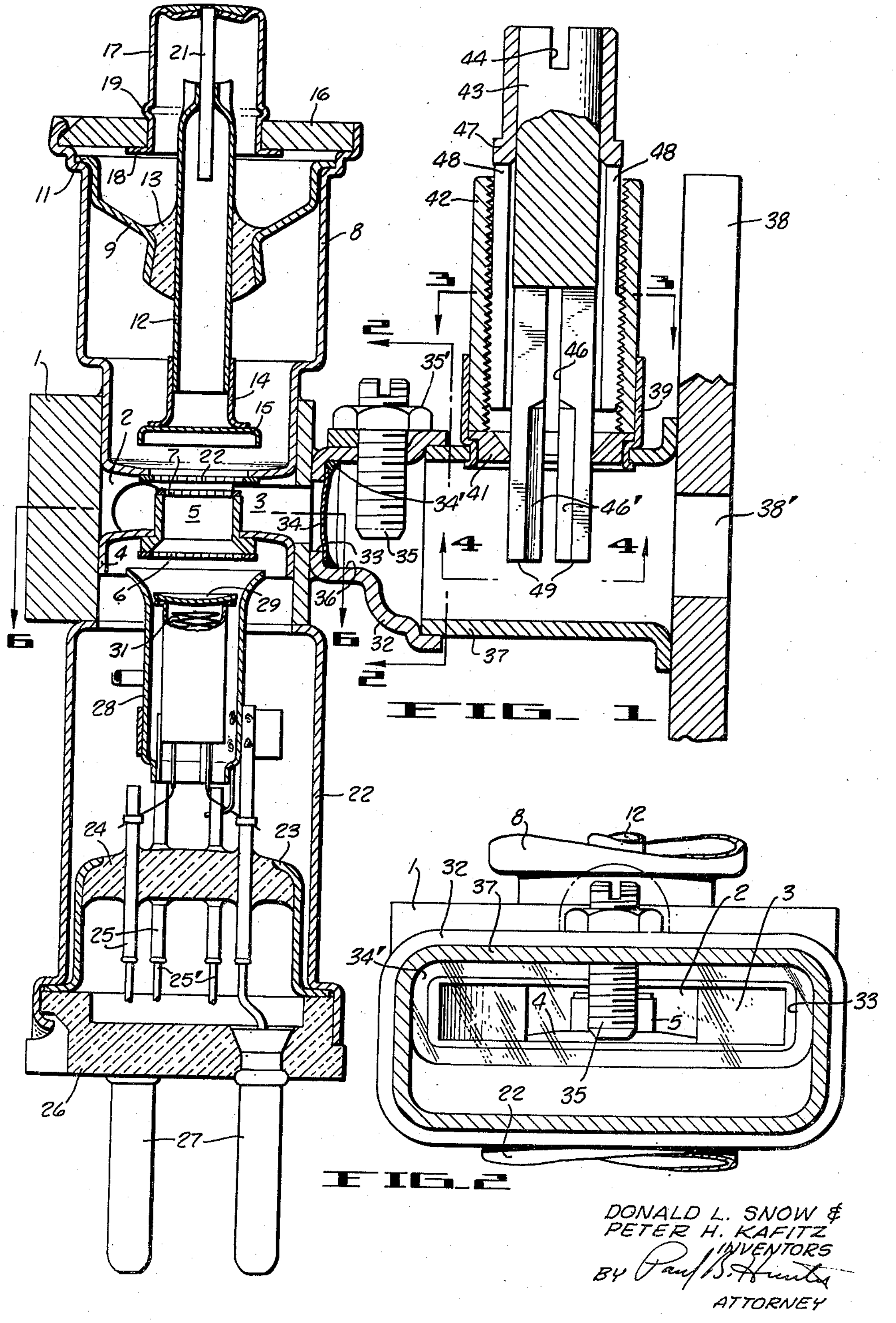

This invention relates generally to ultra-high frequency electromagnetic apparatus and the invention has reference more particularly to a novel tuning apparatus for utilization in wave propagating structures or cavity resonators particularly of the external or non-evacuated type.

The novel tuning apparatus of this invention is particularly applicable for the rapid tuning of external cavity resonators utilized in velocity-modulation tube devices, such as klystrons of the internal-external cavity type wherein the tunable external cavity resonator is outside the vacuum envelope of the klystron and is iris coupled to the internal cavity resonator through a wave-energy permeable vacuum seal. Such externally tunable velocity-modulation devices eliminate the heretofore necessary flexing or diaphragm type of mechanical tuning in which the flexed portion, usually a thin, weak membrane, necessarily serves as a part of the vacuum envelope and is subject to rupture. Therefore, the object of the present invention is to provide a novel tuning apparatus which may be rapidly tuned through an appreciable distance without flexing a cavity wall area and which will remain in a fixed position after tuning without the necessity of lock nuts or other manual type of locking device.

One feature of the present invention is the provision of a novel post tuner device for a hollow wave-propagating structure wherein the post extends through an opening into the structure and is movable within the structure to vary the propagating characteristics thereof, the tuner post being radially resilient and tensioned outwardly so as to bear with a frictional pressure against the bearing surface of the opening.

Another feature of the present invention is the provision of a novel tuner of the above featured type which includes an internally threaded sleeve member secured on the wave structure and a tuner screw in which the post is affixed, the tuner screw extending around the post and having external threads thereon for screwing into the sleeve, the tuner screw being radially resilient and tensioned outwardly so as to bear with a frictional pressure on the threaded surface of the sleeve.

Another feature of the present invention is the provision of a novel tuner of either of the above featured types wherein the tuner rod and/or the tuner screw are split into a plurality of compressed segments.

Another feature of the present invention is the provision of a novel split-tuner device wherein undesired resonance in the tuner, which produces power absorption by the tuner and energy leakage around the tuner, is eliminated.

Still another feature of the present invention is the provision of a novel segmented tuner device incorporating a temperature-compensation feature for maintaining the cavity resonator properly tuned during changes in operating temperatures of the cavity.

Figure 3:
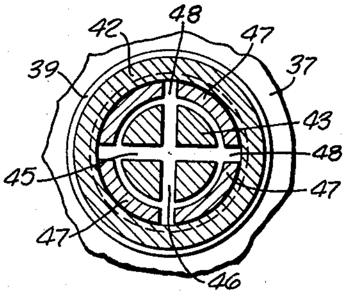
Figure 4:
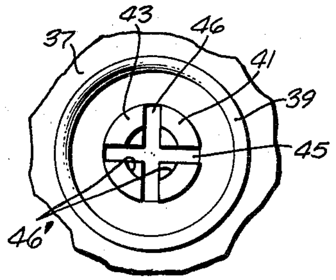
Figures 5, 6:
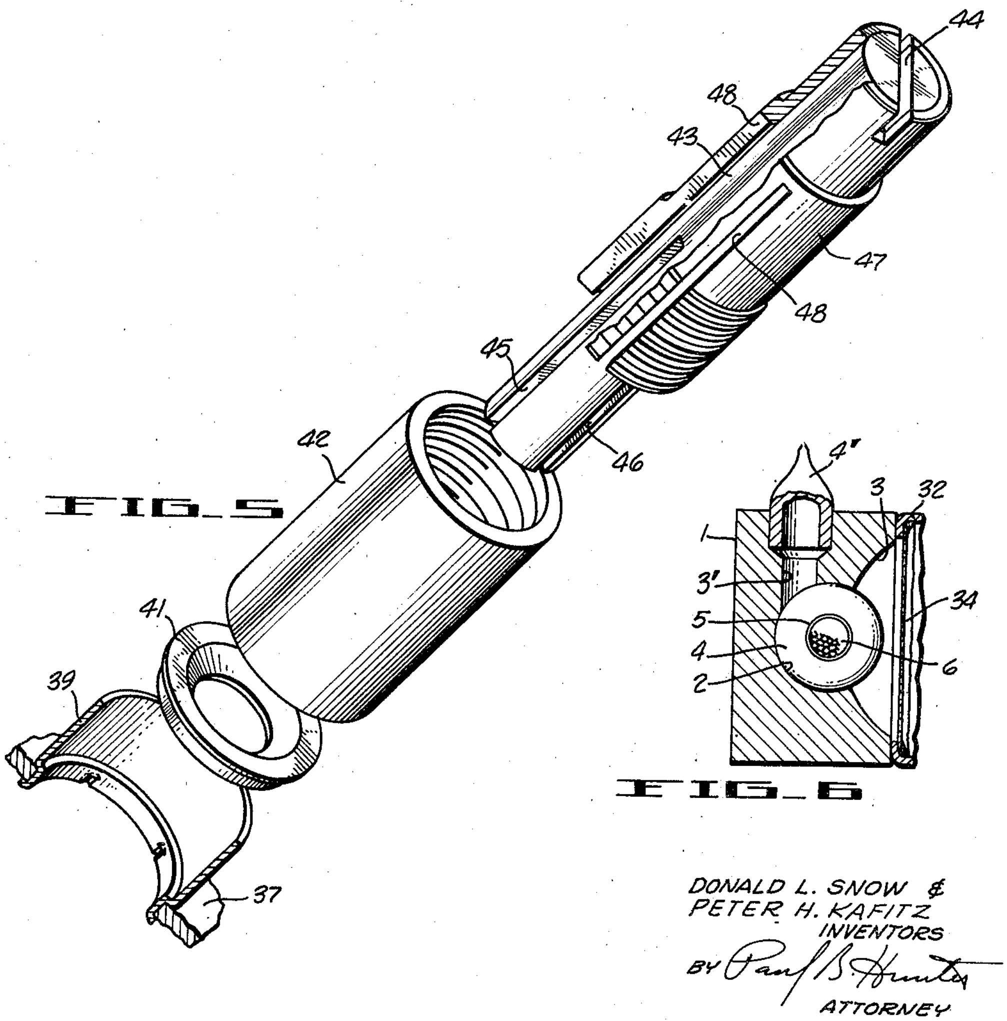

These and other objects and advantages will become apparent from a perusal of the following specification taken in connection with the accompanying drawings wherein:

Fig. 1 is a longitudinal section view of a reflex klystron of the internal-external cavity type which embodies the novel tuner apparatus of the present invention, Fig. 2 is a section view of the klystron in Fig. 1 taken along section line 2—2, Fig. 3 is a section view of the novel tuner apparatus taken along section line 3—3 in Fig. 1, Fig. 4 is an end view of the novel tuner device taken along line 4—4 in Fig. 1, Fgi. 5 is an exploded view, partly fragmentary and partly in section, of the novel external cavity tuner apparatus utilized in the klystron shown in Fig. 1, and Fig. 6 is a transverse section view of the main body block in Fig. 1 taken along section line 6—6.

The novel tuner apparatus shown and claimed in this patent is also shown but not claimed in U. S. Patent No. 2,798,184, issued to B. C. Gardner et al. on July 2, 1957, and assigned to Varian Associates.

Referring now to Figs. 1 through 6, inclusive, there is shown a reflex klystron which comprises a main or central body portion 1 which, in the present instance, is a rectangular block of steel having a large longitudinal bore 2 located slightly off center therein, there being a curved cut or iris opening 3 in one side of the block 1 opening into the bore 2. This iris opening may be rapidly made by one milling operation, the iris opening taking the shape of an arc of a circle or a disk which is slightly less than a semicircle in size (Fig. 6). An exhaust bore 3′ extends into the bore 2, a pinch-off tube 4′ being brazed into the bore 3′.

A cup-shaped header 4, having a substantially cylindrical re-entrant tube 5 secured within a centrally located opening therein, is secured as by brazing within the bore 2 of the central body portion 1. This header 4 and re-entrant tube 5 are made of a suitable metal such as steel. Secured over the open ends of the re-entrant tube 5 are an accelerator grid 6 and a resonator grid 7 which, in the present embodiment, are circular copper-hex grids.

A reflector assembly is secured within the main body bore at one end thereof, this reflector assembly comprising a hollow, substantially cylindrical reflector bulb 8 which is stamped from sheet metal. The reflector bulb 8 has a reflector mounting cup 9 vacuum sealed within the open end thereof by means of a flange 11 on the cup 9. A reflector post 12 is fixedly mounted on the reflector cup 9 by a suitable insulator and vacuum seal 13 such as glass. Secured on the inner end of the reflector post 12 by a small eyelet 14 is a shallow cup-shaped reflector button 15. The post 12, eyelet 14, and button 15 in the present embodiment were spot welded together.

An insulating plastic member 16 is secured within the outer open end of the reflector bulb 8 by crimping therein. A reflector cap 17, which, for example, may be of brass, is mounted within a central opening in the plastic base by a flange 18 and ridge 19. A conducting lead 21 is crimped into the end of the reflector post 12 and electrically connects with the reflector cap 17. A second resonator grid 22 is secured over the inner open end of the bulb 8.

A cathode assembly is secured to the body 1 at the other end of the bore 2. This cathode assembly comprises a stamped sheet-metal cathode bulb 22, which is brazed to the main body block 1. A cathode mounting cup 23 is vacuum sealed within the cathode bulb 22, the inner end of the cup 23 being vacuum sealed by a suitable insulating material such as glass 24. Mounted within the glass seal 24 are mounting stems 25 to which are secured leads 25′. A base 26 of an insulating material such as plastic is secured within the outer end of the cathode bulb 22 as by crimping, the base 26 having prongs 27 secured therein to which the outer ends of the leads 25' are secured. Mounted on the mounting stems 25 within the cathode bulb 22 is a cathode assembly comprising a substantially cylindrical focusing electrode and heat shield 28, a cathode button 29 which may be made of nickel having a suitable electron emissive coating thereon, and heater filament 31.

Mounted as by brazing on the main body block 1 over the iris opening 3 is a waveguide adapter or cup 32, which may be stamped from sheet metal. This waveguide adapter 32 is a multi-stepped, substantially rectangular cup having an opening 33 in its end larger than but conforming to the iris opening 3. Vacuum sealed as by a glass fillet 34' within the waveguide adapter cup 32 over the opening 33 therein is a sheet 34 of wave-energy permeable material such as mica. Threaded through one wall of the adapter 32 is an iris or window loading screw 35 which cooperates with the stepped surface 36 for electrical window loading purposes. Secured as by brazing within the outer end of the cup 32 is a rectangular waveguide section 37 having a mounting flange 38 secured as by brazing on the outer end thereof, the waveguide flange having a circular output opening 38' located therein. Secured within a bore in the upper surface of this waveguide section 37 is a tuner mounting sleeve 39 (see Fig. 5). Secured within the mounting sleeve 39 as by a press fit is an annular-shaped tuner bearing 41, which in the present embodiment is a Phosphor bronze member. Secured within the mounting sleeve 39 is a tuner sleeve 42 having a threaded internal bore. The tuner plunger apparatus comprises a tuner rod or member 43 having a transverse tuning slot 44 cut in the outer end thereof adapted to accommodate a screw driver and two intersecting, longitudinal slots 45 and 46 running approximately half the length of the rod in the inner end thereof, these longitudinal slots splitting the inner end of the rod into four equal segments. Directed inwardly from the split end of the tuner rod is a centrally positioned bore 46', the purpose of this bore being subsequently described.

The tuner member 43 is secured within a two-step bore in a tuner screw 47 which is somewhat shorter than the tuner rod, the rod 43 being secured within the smaller bore in the tuner screw near its outer end. The inner end of the tuner screw 47, having the larger internal bore, has longitudinally running slots 48 therein which cut the inner end into four segments. The inner end of the screw 47 has external threads thereon. This tuner screw 47 is adapted to screw into the tuner sleeve 42, the end segments of the tuner screw 47 being radially resilient and slightly compressed for a tight frictional fit within the sleeve 42. The slotted end of the tuner rod 43 fits through the bore in the tuner bearing 41 such that the segments of the rod 43 are radially resilient and compressed tightly so as to bear firmly against the bore surface in the tuner bearing 41. The inner edge or bearing surface of the bearing 41 is rounded slightly to obtain the optimum electrical contact between the bearing and tuner rod 43.

In operation, electrons emitted from the cathode 29 due to the heating of the cathode by the filament 31 are focused into a beam by the focusing electrode 28 and accelerated through the klystron by high positive voltages on the accelerator electrode 6. In accordance with well-known klystron reflex action, the electrons pass through the resonator gap between grids 7 and 22 where they interact with the R. F. electric field across the gap, the R. F. field velocity-modulating the beam. The electrons pass into the space adjacent the reflector electrode 15 which carries a negative potential adapted to repel the electrons in the beam. The electrons are turned about and again pass through the resonator gap between grids 7 and 22, the electrons passing through in bunches due to the velocity modulation effect which took place in the electron beam. The bunched electrons deliver energy to the field across the resonator gap. The R. F. energy is removed from the cavity resonator through the iris opening 3 and the output waveguide section 37. The window loading screw 35 is adjusted to produce a capacity loading across the window to thereby obtain an optimum coupling between the cavity resonator and the output waveguide section. After the optimum coupling is obtained, the screw 35 may be locked in place by its lock nut 35'.

The klystron may be tuned over its operating frequency range by means of the tuner rod 43 in the external cavity resonator. The capacity value of the external cavity formed by the waveguide section 37 is varied by means of the controlled spacing of the end 49 of the rod 43 from the lower wall of section 37.

Since tuning of the klystron occurs frequently in use, as compared to the generally one initial time that the coupling screw 35 is adjusted, the requirement of mechanically locking and unlocking the tuning rod 43 with each tuning, such as by a lock nut, is very undesirable. The novel tuning structure disclosed in Figs. 1, 3, 4 and 5 does not require a separate locking structure. The tuner rod 43 is split into four sections at its inner end and the segments are spread slightly apart. The rod is inserted into the external cavity resonator through the bore in the bearing 41, the rod segments being compressed slightly and exerting a firm frictional pressure on the bearing 41. The tuner screw 47 also has its inner end threaded and split into segments, the segments being bent outward slightly such that when the screw 47 is threaded into the tuner sleeve the segments of the tuner screw 47 are compressed at their inner ends and bear firmly and securely with an outwardly directed force against the threaded interior of the sleeve 42. The tuner rod 43 is thus tensioned outwardly firmly against the bearing 41 while the tuner screw 47 is tightly positioned within the sleeve 42 and shaking or vibrating of the klystron will not produce a turning motion of the tuner rod because of its secure frictional fit. The tuner rod 43 and associated tuner screw 47 may be turned for tuning purposes by means of a screw driver or by other means such as a knob or the like.

The tendency for a resonance to be produced in the segmented tuner structure which would produce undesirable power absorption from the external cavity by the tuner and also leakage of electromagnetic energy from the cavity around the tuner structure may be prevented in any of several ways. In the absence of a bore 46' in the tuner rod, a conductive wire may be soldered or otherwise secured on the inner end of the tuner rod 43 coupling the plurality of segments or the slots 45, 46 in the inner end of the rod 43 may be filled with a compound of an elastic filler and a lossy material such as, for example, elastic rubber and powdered iron. Still another way of preventing these resonances is to locate a properly proportioned bore 46' in the end of tuner rod 43. The bore 46' is placed in the end of the tuner rod to shift any resonances occurring within the tuner structure to a point outside the frequency bandwidth through which the reflex klystron operates. In addition the slots 45 and 46 and surfaces of bore 46' are coated with a good conducting material such as copper or gold plate. Of course the outer bearing surface of rod 43 is plated with a metallic coating which will withstand frictional abrasion such as, for example, chrome plating.

This novel split tuning apparatus may be conveniently adapted for thermal compensation, the tuner structure automatically compensating for frequency changes in the external cavity resonator arising from expansion or contraction of the cavity walls due to temperature variations during operation. For example, the sleeve 42 and tuner screw 47 may be made of a material having a high coefficient of expansion such as, for example, beryllium copper, while the tuner rod 43 may be of a metal having a low coefficient of expansion such as Kovar. Thus, during changes in the size of the external cavity due to temperature variation of the metal cavity, the length of the tuner rod changes a different proportion than the tuner screw, resulting in a relative movement between the rod 43 and the screw 47. For example, as the length of the sleeve and screw 47 increases due to a temperature rise, the length of the tuner rod 43 increases to a lesser degree and the net result is a movement of the tuner rod out of the cavity to thereby compensate for the increase in the size of the external cavity resonator due to the temperature increase. Thus, the frequency of the external cavity resonator remains constant during variations in operating temperature.

The radio frequency energy passes out from the external cavity resonator through a waveguide flange opening 38' into the external load circuits.

Since many modifications and variations may be made from the described apparatus without departing from the spirit of the invention, the foregoing invention is to be considered as exemplary and not in a limiting sense.

What is claimed is:

1. In combination, a cavity resonator comprising a metallic chamber and a capacitive post tuner assembly mounted on the chamber for relative movement within the chamber to capacitively tune the resonance frequency of said chamber, said tuner assembly comprising a movable tuner post member extending into the chamber through an opening in the wall of said chamber, the tuner post member being split into a plurality of segments at its inner end, the segments being tensioned outwardly so as to bear with a frictional pressure upon the bearing surface of said opening.

2. A combination as claimed in claim 1, wherein the split end of said tuner post member has an axial bore extending up the post member from the end thereof for the elimination of undesirable resonance in the tuner assembly.

3. In combination, a cavity resonator comprising a metallic body having a resonator chamber formed therein, a tuner assembly mounted on said body and extending within the chamber for relative movement within the chamber to tune the resonance frequency of the chamber, said tuner assembly comprising an annular bearing member in one wall of said body, a cylindrical tuner sleeve having a threaded internal bore secured to said one wall in axial alignment with said annular bearing member extending outwardly from the chamber, and means including a cylindrical capacitive tuner rod threaded into said bore in the tuner sleeve with said tuner rod extending through said bearing member into the resonator chamber for capacitive interaction with an inner wall surface of said chamber, the tuner rod being split into a plurality of segments at its inner end, the segments being compressed together slightly by the bearing surface of said bearing member.

4. A combination as claimed in claim 3, including means coupled to said segmented tuner rod for preventing radio frequency leakage through the space between the segments.

5. A combination as claimed in claim 4, wherein said means coupled to said segments comprises an elastic material containing a lossy substance located in the space between the segments of the tuner rod.

6. A combination as claimed in claim 3, wherein the split end of said tuner rod has an axial bore extending up the rod from the end thereof for the elimination of undesirable resonance in the tuner apparatus.

7. In combination, a cavity resonator comprising a metallic body forming a resonator chamber having opposing walls, a tuner assembly mounted in one wall and extending within the chamber for electrical interaction with the opposite wall, said tuner assembly comprising an annular bearing member positioned in an opening in said one wall, a cylindrical tuner sleeve having a threaded internal bore secured in axial alignment with said annular bearing member extending outwardly from the chamber, a cylindrical tuner screw having an axial bore therein and an external thread adapted to be screwed into said sleeve, and a cylindrical capacitive tuner rod fixedly secured within the bore of said tuner screw and extending through said bearing member into the resonator chamber for capacitive interaction with said opposite wall, said tuner rod being movable relative to said opposite wall by screwing said tuner screw in said sleeve, the tuner rod being split into a plurality of segments at its inner end, the segments being compressed together slightly by the bearing surface of said bearing member.

8. A combination as claimed in claim 7, wherein the tuner rod is made of a metal having a different coefficient of expansion than the tuner screw such that temperature compensation is provided to maintain the external cavity properly tuned during changes in operating temperature of the cavity resonator.

9. A combination as claimed in claim 7, wherein the larger diameter axial bore in said tuner screw is multi-diameter, said tuner rod being secured within a smaller diameter portion of the bore and extending through the bore of said tuner screw into the bearing member, the larger diameter portion of said tuner screw having the external threads thereon and being split into a plurality of segments such that the threaded segments of the tuner screw threaded within the tuner sleeve are compressed together slightly within the tuner sleeve.

10. A combination as claimed in claim 7, including means coupled to said segmented tuner rod for preventing radio frequency leakage through the space between the segments.

11. A combination claimed in claim 10, wherein said means comprises a conducting member electrically coupling certain of the segments at the inner end of the tuner rod.

12. A combination as claimed in claim 10, wherein said means comprises an elastic material containing a lossy substance located in the space between the segments of the tuner rod.

13. A reflex klystron including a vacuum envelope having a cathode means therein for producing a beam of electrons, a re-entrant cavity resonator internal of the vacuum envelope and positioned in the beam path for interaction therewith, said internal cavity resonator having an iris opening leading therefrom, a second cavity resonator coupled to the first cavity resonator at the iris opening, a wave energy permeable member vacuum sealing the internal cavity resonator from the second or external cavity resonator, and a tuner assembly for tuning the reflex klystron extending within said external cavity resonator, said tuner assembly comprising a movable capacitive post tuner member extending through an opening into the external cavity resonator for capacitive interaction with one of the wall surfaces of said external cavity resonator, the tuner post being split into a plurality of segments at its inner end, the segments being tensioned outwardly so as to bear with a frictional pressure upon the bearing surface of said opening.

14. In combination, a hollow wave-propagating structure and a high frequency post tuner assembly mounted on said structure, said tuner assembly comprising a movable tuner post member extending into the hollow structure through an opening in the wall of said structure for relative movement within the structure to vary the propagating characteristics of said structure, the tuner post member being radially resilient and tensioned outwardly so as to bear with a frictional pressure against the bearing surface of said opening.

15. The combination as claimed in claim 14 wherein said post tuner assembly includes an internally threaded sleeve member fixedly secured on the outer side of said waveguide structure, and a tuner screw in which said tuner post is securely affixed, the tuner screw extending around said tuner post and having external threads on the outer surface thereof for screwing into said sleeve, said tuner screw being radially resilient and tensioned outwardly so as to bear with a frictional pressure upon the inner threaded surface of said sleeve.

16. The combination as claimed in claim 15 wherein said tuner screw is split into a plurality of segments, the segments being tensioned outwardly against the sleeve member to hold the tuner screw securely within the sleeve.

17. A reflex klystron including a vacuum envelope having a cathode means therein for producing a beam of electrons, a re-entrant cavity resonator internal of the vacuum envelope and positioned in the beam path for interaction therewith, said internal cavity resonator having an iris opening leading therefrom, a second cavity resonator coupled to the first cavity resonator at the iris opening, a wave energy permeable member vacuum sealing the internal cavity resonator from the second or external cavity resonator, and a tuner assembly for tuning the reflex klystron extending within said external cavity resonator, said tuner assembly comprising a movable electrical post tuner member extending through an opening into the external cavity resonator for electrical interaction with said external cavity resonator, the tuner post being radially resilient and tensioned outwardly so as to bear with a frictional pressure against the bearing surface of said opening whereby the tuner post is held in a secure manner within the second cavity resonator.

18. A reflex klystron as claimed in claim 17 wherein said tuner post assembly includes an internally threaded sleeve member fixedly secured on the outer side of said external cavity resonator, and a tuner screw in which said tuner post is securely affixed, the tuner screw extending around said tuner post and having external threads on the outer surface thereof for screwing into said sleeve, said tuner screw being radially resilient and tensioned outwardly so as to bear with a frictional pressure upon the inner threaded surface of said sleeve.

19. A reflex klystron as claimed in claim 18 wherein said tuner screw is split into a plurality of segments, the segments being tensioned outwardly against the sleeve member to hold the tuner screw securely within the sleeve.

References Cited in the file of this patent

UNITED STATES PATENTS

| | | |
|---|---|---|
| 2,422,695 | McRae | June 24, 1947 |
| 2,424,576 | Mason | July 29, 1947 |
| 2,439,831 | Varian et al. | Apr. 20, 1948 |
| 2,472,038 | Yando | May 31, 1949 |
| 2,503,266 | Harrison et al. | Apr. 11, 1950 |
| 2,566,759 | Clark et al. | Sept. 4, 1951 |